United States Patent [19]
Takahashi et al.

[11] Patent Number: 6,086,321
[45] Date of Patent: Jul. 11, 2000

[54] HANDLING METHOD AND ROBOT USED FOR THE SAME

[75] Inventors: Toshiyuki Takahashi; Atsushi Nakajima; Yukimasa Shiomichi, all of Yamaguchi, Japan

[73] Assignee: Toyo Kohan Co., Ltd., Tokyo, Japan

[21] Appl. No.: 08/930,045

[22] PCT Filed: Mar. 8, 1996

[86] PCT No.: PCT/JP96/00566

§ 371 Date: Feb. 11, 1998

§ 102(e) Date: Feb. 11, 1998

[87] PCT Pub. No.: WO96/30169

PCT Pub. Date: Oct. 3, 1996

[30] Foreign Application Priority Data

Mar. 31, 1995 [JP] Japan .................................. 7-100441

[51] Int. Cl.[7] .................................................. B65H 3/08
[52] U.S. Cl. .................. 414/793; 364/478.01; 414/797; 901/46
[58] Field of Search .............................. 414/792.8, 792.9, 414/793, 797; 294/907; 901/20, 40, 46; 212/286; 364/478.05

[56] References Cited

U.S. PATENT DOCUMENTS

| | | | |
|---|---|---|---|
| 4,228,993 | 10/1980 | Cathers | 414/793 |
| 4,547,115 | 10/1985 | Charbonnet | 414/797 |
| 4,565,478 | 1/1986 | Ericsson | 414/797 |
| 4,750,132 | 6/1988 | Pessina et al. | 212/286 |
| 4,978,275 | 1/1990 | Reid et al. | 414/793 |
| 5,017,075 | 5/1991 | Block | 294/907 |

FOREIGN PATENT DOCUMENTS

| | | |
|---|---|---|
| 60-188231 | 9/1985 | Japan . |
| 62-027234 | 2/1987 | Japan . |
| 62-216730 | 9/1987 | Japan . |
| 2-232184 | 9/1990 | Japan . |
| 4-201237 | 7/1992 | Japan . |
| 4-274833 | 9/1992 | Japan . |
| 6-156769 | 1/1994 | Japan . |

*Primary Examiner*—Gregory A. Morse
*Attorney, Agent, or Firm*—Browdy and Neimark

[57] ABSTRACT

A method of handling a robot, comprising a work search step of allowing an arm to approach a stack base at high speed and then at low speed until a work is detected; a step of stopping the arm when the work is detected, storing the position of the work as the work height, and gripping the work; a step of allowing the arm at high speed to approach a deceleration starting position defined by adding a predetermined value to the stored work height when the arm again approaches the stack base, allowing the arm to approach the work to the stored work height at low speed, detecting the work, and allowing the arm to grip the work; and a step of correcting value of the work height when the work is not detected and again allowing the arm to approach the work at low speed. Since the range in which the arm moves at low speed is reduced, the cycle time is shortened.

3 Claims, 10 Drawing Sheets

HANDLING METHOD AND ROBOT USED FOR THE SAME

TECHNICAL FIELD

The present invention relates to a handling method and a robot used for the method, and more particularly to a handling method and a robot used for the method where works which are stacked on a stack base are loaded one by one to a working machine such as a press or a press brake or a packaging machine such as a binder, or machined works are stacked on a stack base one after another.

BACKGROUND OF THE INVENTION

Conventionally, as shown in FIG. 10, this type of robot is disposed in the periphery of a working machine 50 and is provided with a plurality of arms 52 which are connected by a plurality of revolute joints 51. A hand 53 mounted on the front most arm 52 is regulated to trace a plurality of points which are preliminarily taught. The hand 53 is provided with a gripping element such as a vacuum cup 54 and a sensor 56 which detects a work 55 coming into contact with the vacuum cup 54 as the hand 53 is descended. To load the work 55 to the working machine 50, a work searching operation is carried out in which the ha nd 53 is firstly shifted to a position which is located a predetermined distance right above the works 55 stacked on a sheet stack base 57. The hand 53 is then descended slowly until the sensor 56 detects the vacuum cup 54 coming into contact with the work 55 and then the descending of the hand 53 is stopped. When the descending operation of the arm 52 is stopped upon detection of the work 55, the operation is succeeded by a next operation such as a transferring of the work 55 to the working machine 50. On the other hand, in case that a work 58 after machining is to be stacked on a product stack base 59 one after another, the above-mentioned operation is carried out substantially in the same manner but in a reverse mode. Namely, the sensor detects the work 58 gripped by the vacuum cup 54 coming into contact with the product stack base 59 and evacuates or releases the suction force of the vacuum cup 54 thus allowing the vacuum cup 54 to advance to a transferring of a next work 58 to the product stack base 59. In FIG. 10, a numeral 60 indicates a control panel.

In the above-mentioned method, the arm 52 is slowly descended from the highest position which is higher than the uppermost stacked work. Accordingly, in case that the works 55, 58 which are stacked on the stack base 57,59 are small in number, time is wasted and a cycle time is elongated. The task of the present invention substantially lies in making the cycle time short employing the above-mentioned conventional apparatus and method.

DISCLOSURE OF INVENTION

The handling method according to the present invention is a method for approaching a work gripping hand toward a stack base and works stacked on the stack base so as to pick up or stack works and is characterized in that the method comprises (a) a step of positioning the hand a predetermined distance above the stack base, (b) a step of allowing the hand to approach at high speed to a deceleration starting position a predetermined distance higher than the height of works stored in a memory, (c) a step of making the hand to approach at low speed to the height of works stored in the memory from the deceleration starting position and (d) a step of stopping the hand at the height of works stored in the memory and gripping the work or releasing the gripped work.

An additional mode of the handling method according to the present invention comprises (a) a work search step of positioning the hand at a position a predetermined distance above the stack base and allowing the arm to approach the stack base at low speed until the work or the stack base disposed below the hand is detected and stopping the hand when the work or the stack base is detected, (b) a step of storing the detected position as the height of works, (c) a gripping step of gripping the work or releasing the gripped work at the hand stopped position, (d) an intermediate step for advancing to a next step, (e) a high speed approaching step of positioning the hand again at a position a predetermined distance above the stack base and allowing the hand to descend at high speed to a deceleration starting position which is slightly above the stored height of works, (f) a low speed approaching step allowing the hand to descend to the stored height of works, (g) a re-gripping step of gripping the work or releasing the gripped work and (h) a step of repeating the above steps (d) to (g).

In the above step (b), the data on the work height can be calculated by adding or subtracting the thickness of one piece of work to the data on the height of the hand obtained in the work search step (a). Furthermore, in the low speed approaching step (f), whether the work is present or not may be detected and if the work is not detected, a correction calculation is first carried out to add or subtract a desired value and thereafter the hand is lowered at a low speed to the height determined by the corrected data. Still furthermore, in the low speed approaching step (f), the arm may be lowered until the work is detected and the data correction is executed based on the work loaded height at the time of detecting the work.

The handling robot according to the present invention is a robot of a type which repeats the transfer of the work in such a manner that one piece of work is gripped and transferred from or to the base at a time. The handling robot comprises a hand which grips the work, arms which hold the hand, a mechanism for elevating and lowering the arm, detecting means for detecting the height of the arm, a control unit which controls the height of the arms and the lowering speed in at least two stages, and work detecting means for detecting the hand coming into contact with the work. The control unit includes an arithmetic calculating and storing block which calculates the real time height of the work on the base based on the data concerning with the previous height of the work, a command block which, based on the real time data on the height of the work, lowers the arm at a high speed to a position which is slightly higher than the height of the work in the data and subsequently lowers the arm at a low speed until the work detecting means detects the work. In such a robot, the hand is freely rota table in upward and downward directions relative to the arms and also is held at the rotated position by the arms. The robot may preferably be provided with spring means which biases the hand in a downward direction relative to the arms. In this case, the work detecting means is constructed such that the detecting means can detect the hand in an elevated position relative to the arm.

According to the primary method of the present invention, the height of the work is stored in the control unit, and the arms approach at a high speed to a deceleration starting position which is calculated based on the stored height of the work, and approach to the work a remaining distance at a low speed. The high speed motion of the arms toward the deceleration starting position and the low speed motion of the arms toward the position to be stopped are controlled by a feed forward control. Accordingly, the overall cycle time can be shortened.

According to the second method of the present invention, in the first gripping operation for gripping the work for the first time, the hand is lowered slowly while searching the work. Namely, a feed back control of the work position is carried out and the work loaded height is detected with this control and stored. In the succeeding gripping operations, as in the case of the primary method, the feed forward control is carried out thus the cycle times for carrying out these gripping operations can also be shortened. In such a feed forward control, the calculation is carried out such that the thickness of one piece of the work is added to or subtracted from the height of the work. If an operation to detect whether the work is present or not will be carried out in the low speed approaching step (f) and a correction calculation will be carried out for adding or subtracting a predetermined value in case that the work is not detected, it will be sufficient to carry out such a feed forward control once in several gripping operations.

The feed forward control may be carried out each time so as to detect the height of the work and renew the data on the height of the work each time. Even in such a case, the low speed approaching time can also be shortened so that the cycle time can be shortened compared to the conventional method.

The robot according to the present invention is provided for carrying out the above-mentioned handling method. In such a robot, the hand is freely moved in upward and downward directions relative to the arms and held in place. If the robot is provided with springs which bias the hand in a downward direction relative to the arms, the error which occurs within a range of the vertical movement of the hand relative to the arms can be absorbed by the springs so that the above-mentioned method can be carried out as desired. Furthermore, if the detection of the work is carried out based on the vertical movement of the hand, the accuracy of the work detecting operation can be enhanced.

BEST MODE FOR CARRYING OUT INVENTION

The method and robot according to the embodiment of the present invention are explained with reference to attached drawings hereinafter.

Figure 1:
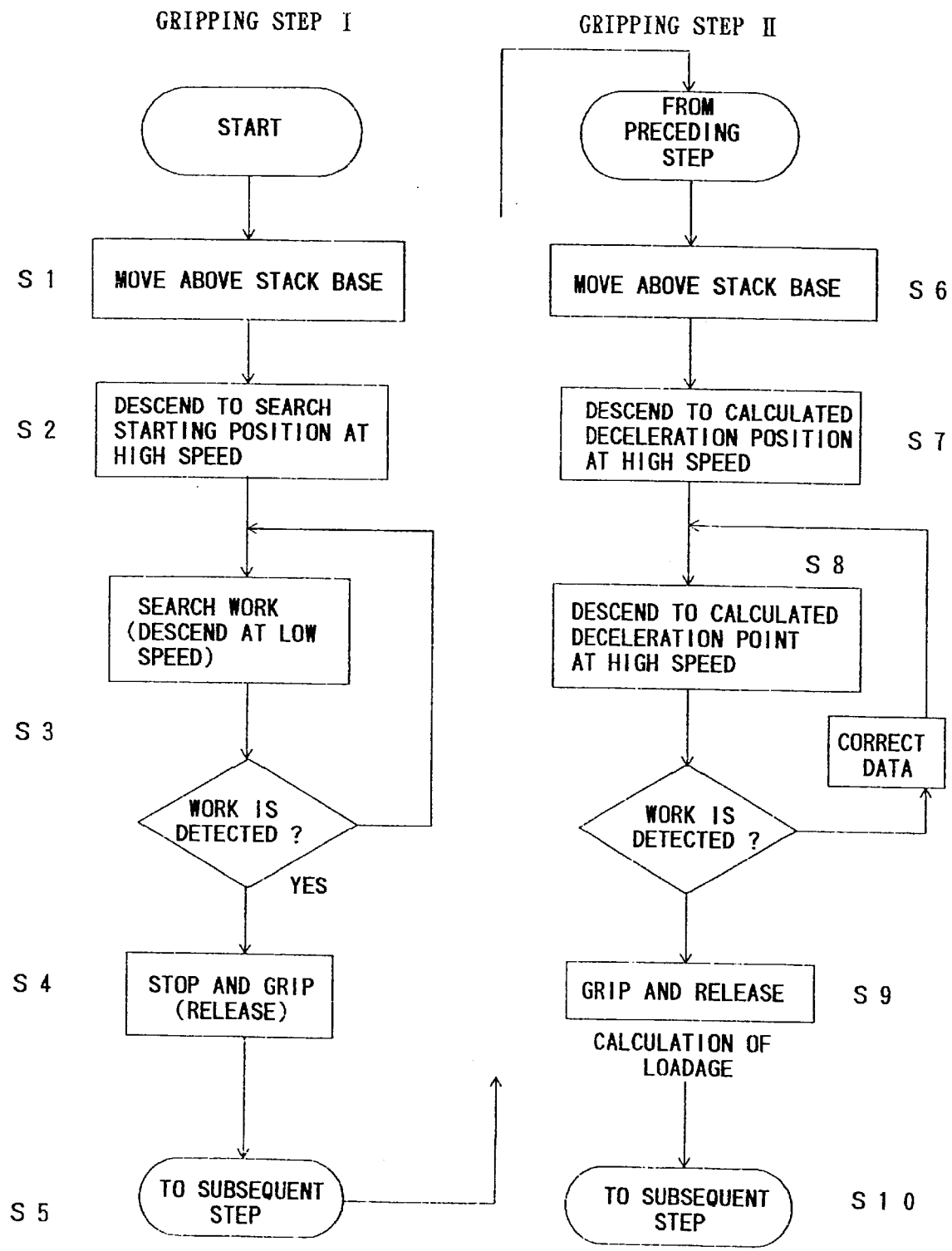
FIG. 1 is a schematic flow chart showing one embodiment of the handling method according to the present invention.
Figure 2:
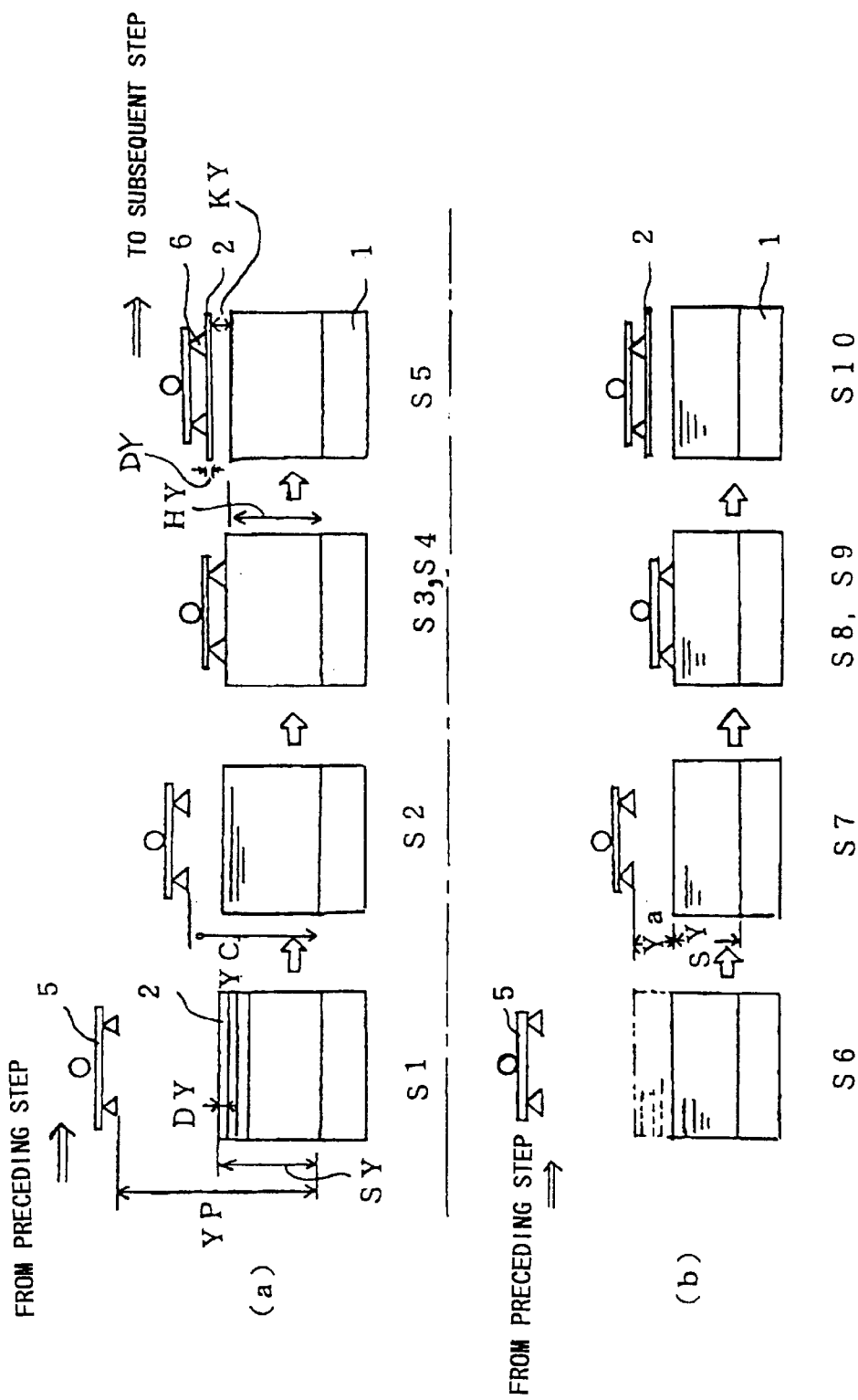
FIG. 2a is a schematic diagram showing the steps of the handling method.
FIG. 2b is another schematic diagram showing the steps of the handling method.
Figure 3:
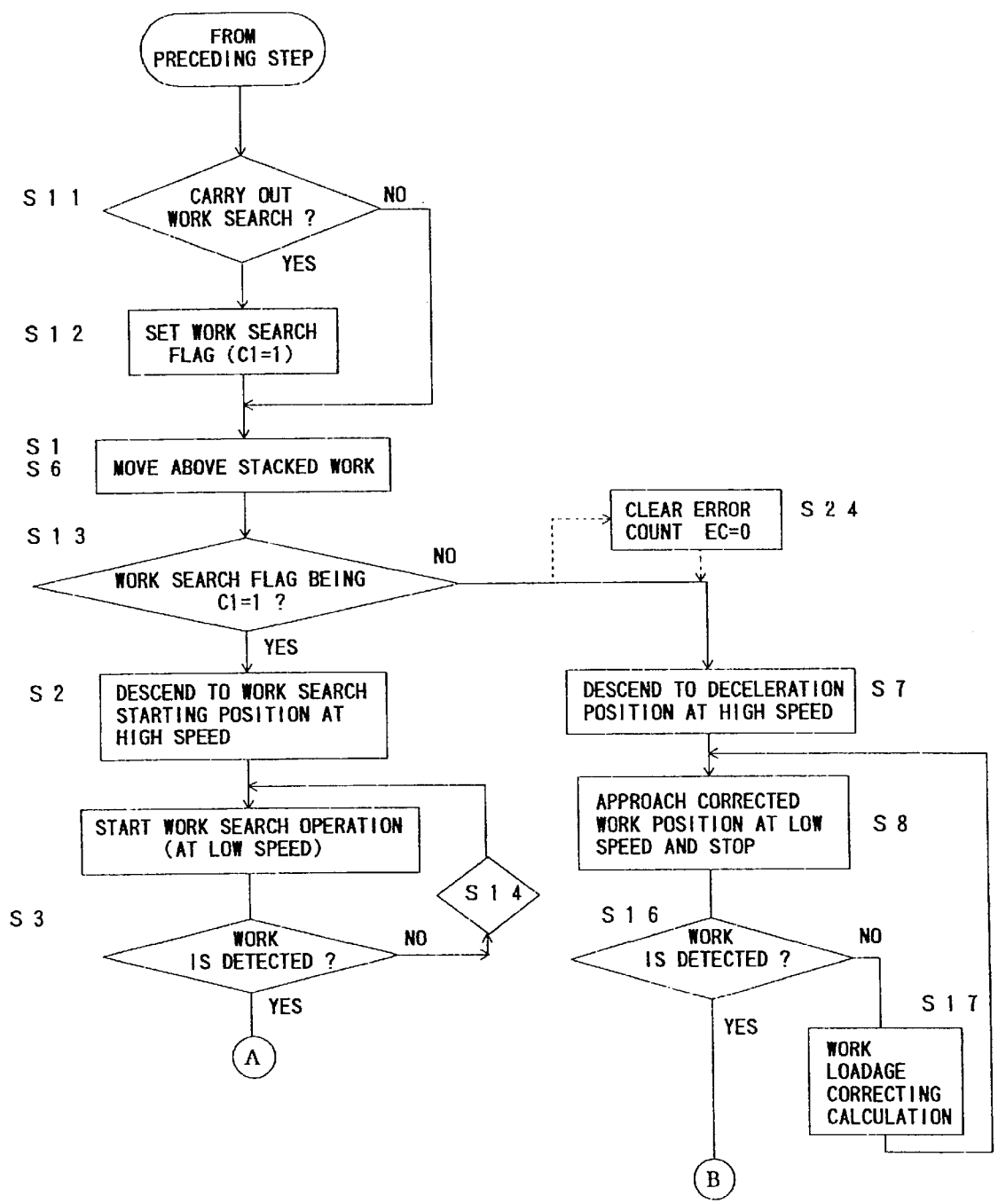
FIG. 3 is a first part of a flow chart showing the detail of the handling method as shown in FIG. 1.
Figure 4:
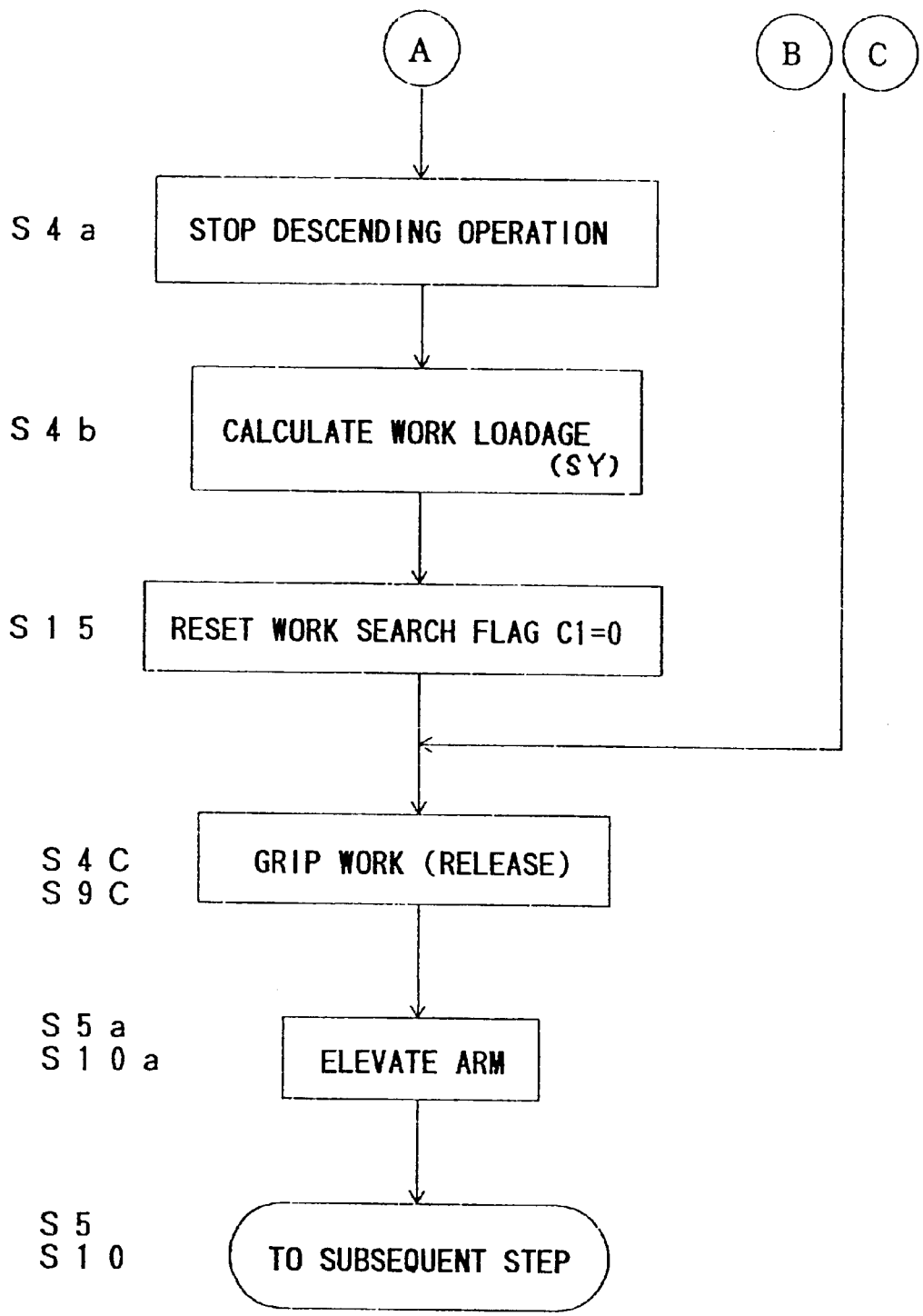
FIG. 4 is a second part of the flow chart showing the detail of handling method as shown in FIG. 1.
Figure 5:
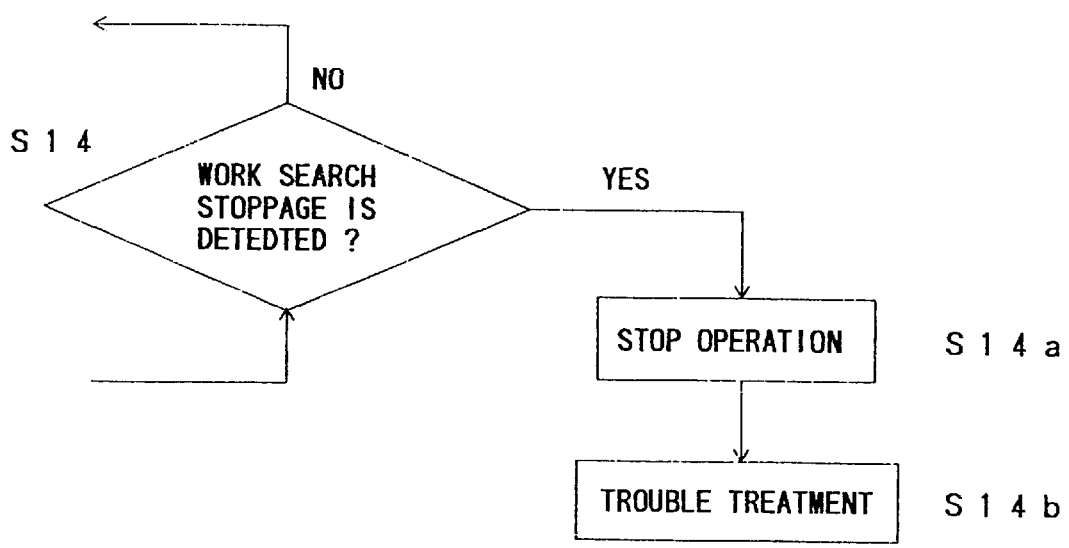
FIG. 5 is a partial flow chart showing another embodiment of the handling method according to the present invention.
Figure 6:
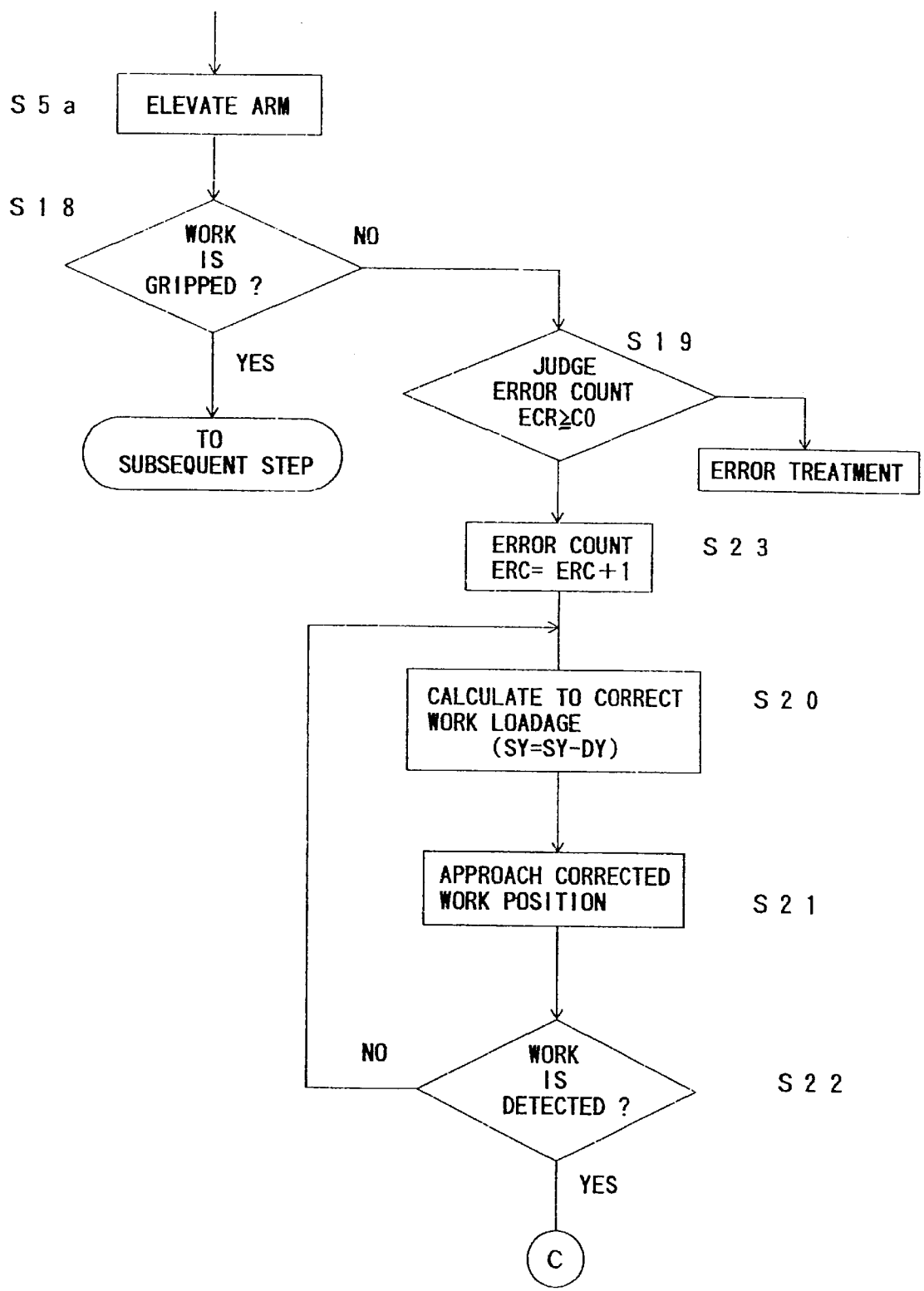
FIG. 6 is a schematic flow chart showing one application of the handling method according to the present invention.
Figure 7:
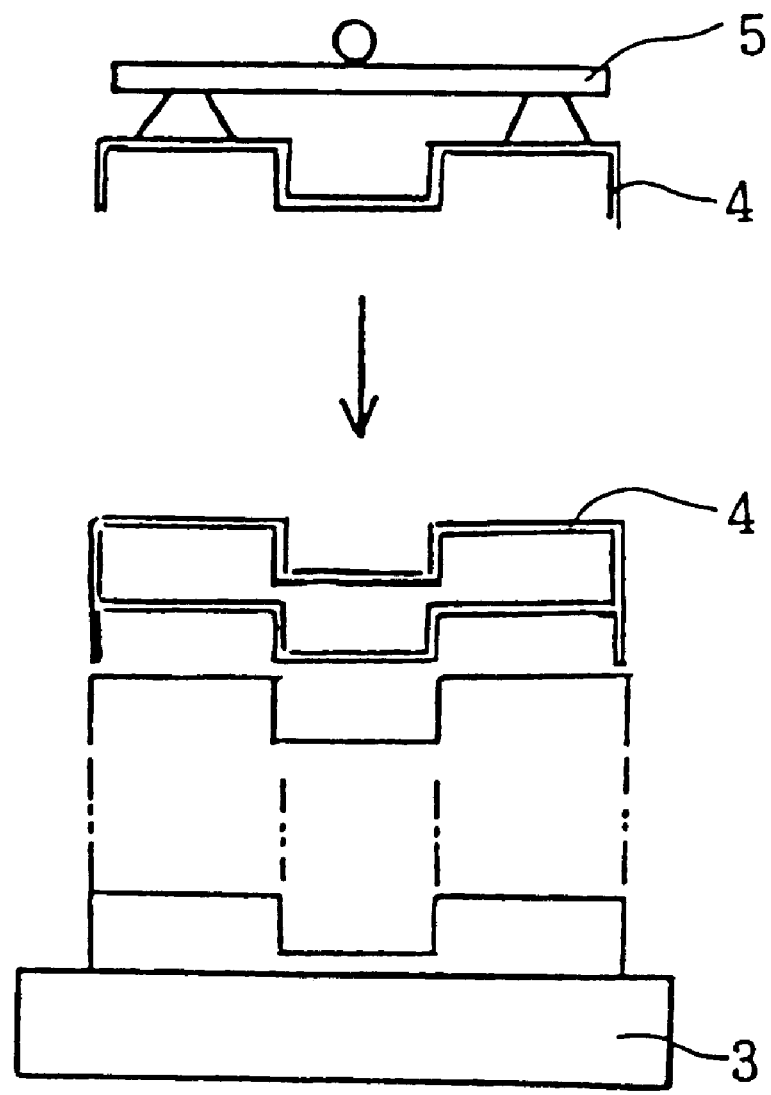
FIG. 7 is a schematic diagram showing the steps for loading in the handling method according to the present invention.
Figure 8:
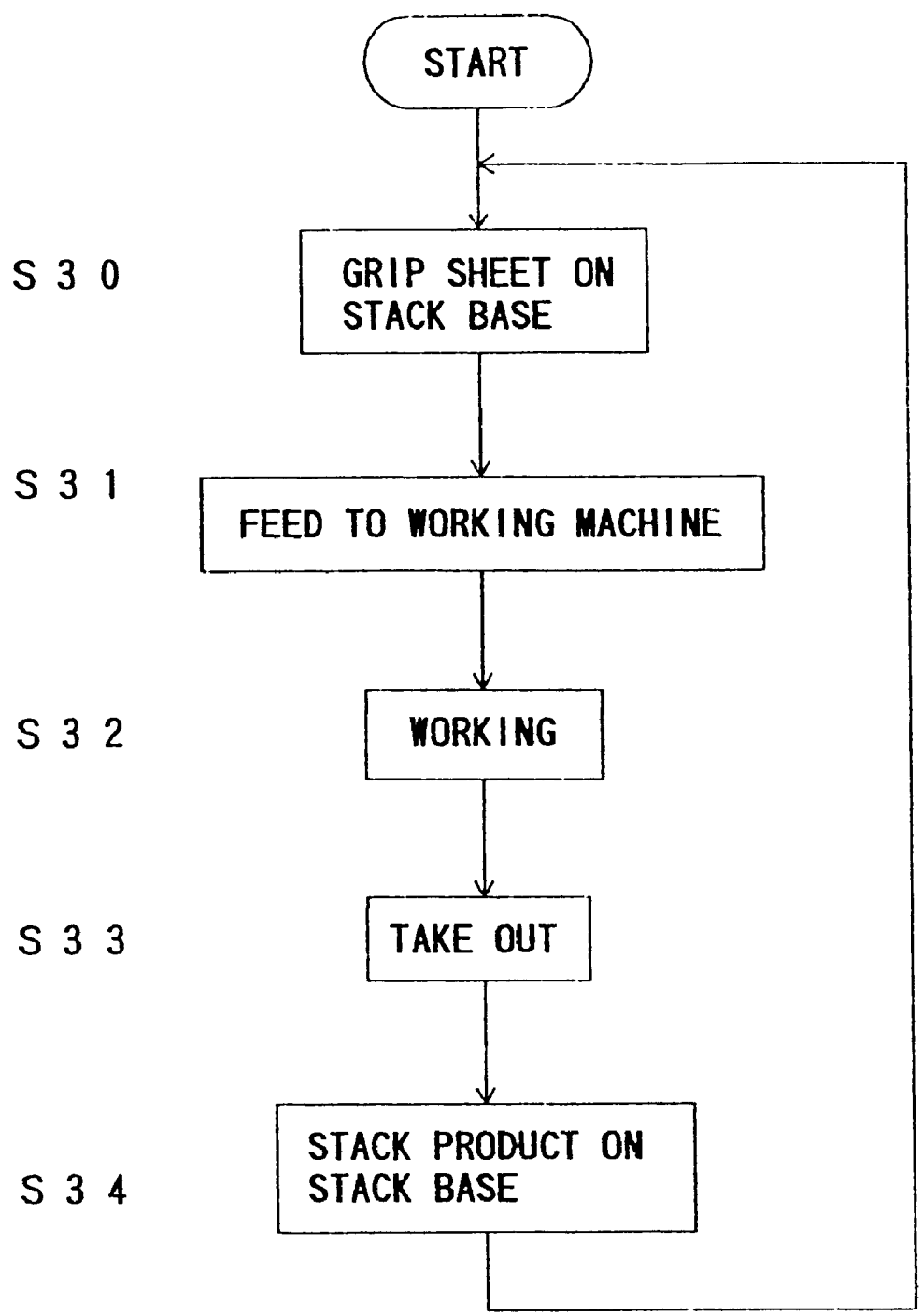
FIG. 8 is a flow chart showing the steps for picking up in another embodiment of the handling method according to the present invention.
Figure 9:
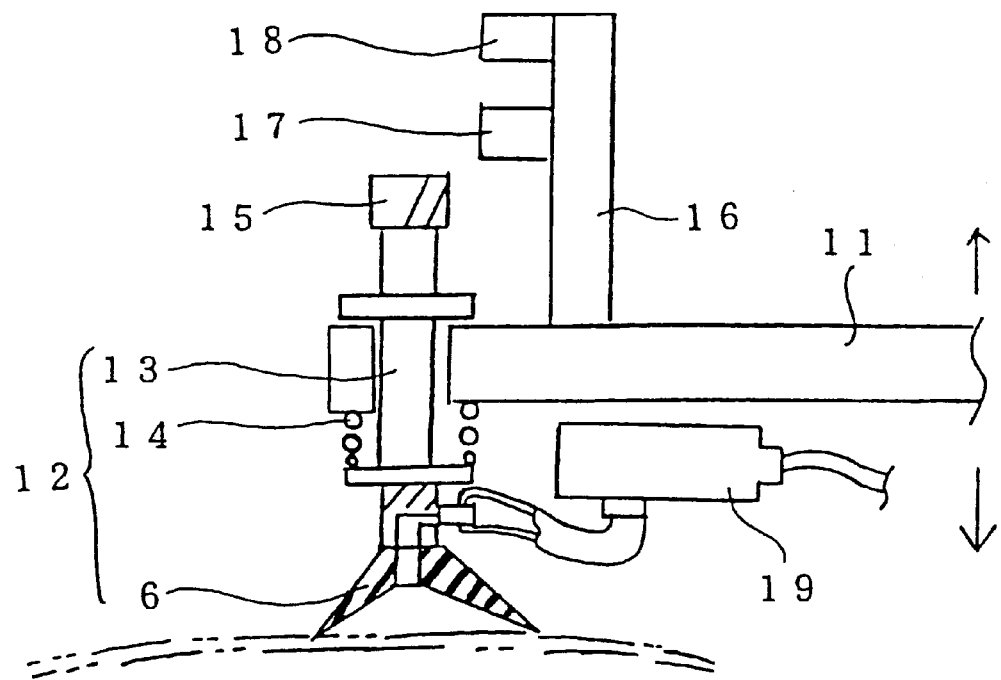
FIG. 9 is a schematic view showing a modification of a hand of a robot according to the present invention.
Figure 9:
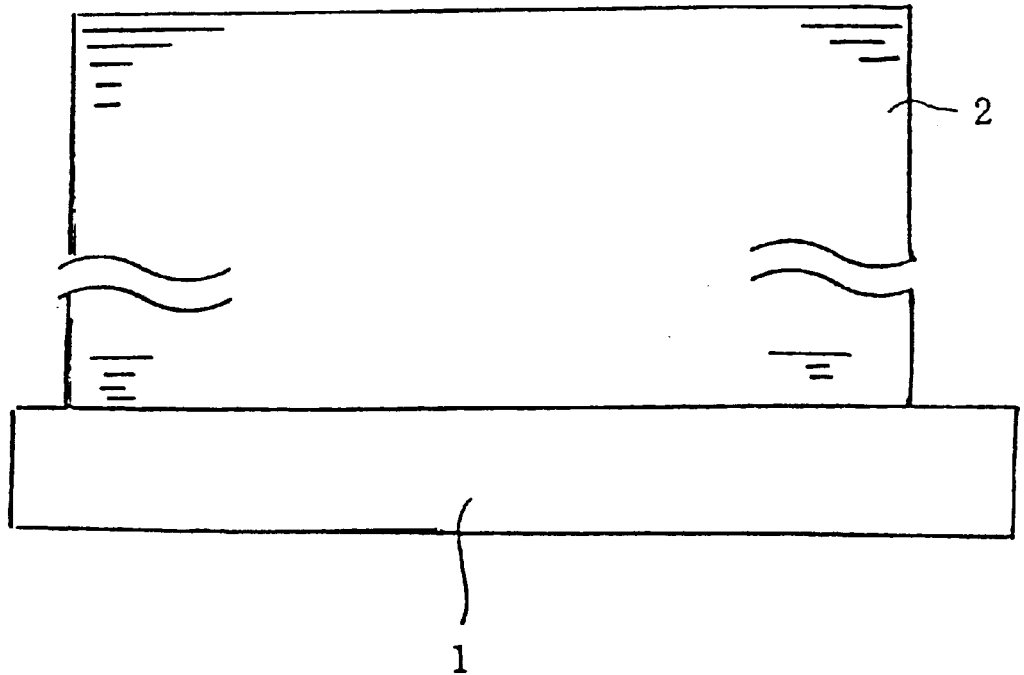

In the drawings, FIG. 1 is a schematic flow chart showing one embodiment of the handling method according to the present invention, FIG. 2a and FIG. 2b are schematic diagrams showing the steps of the handling method, FIG. 3 and FIG. 4 constitute a flow chart showing the detail of the handling method as shown in FIG. 1, FIG. 5 is a partial flow chart showing another embodiment of the handling method according to the present invention, FIG. 6 is a schematic flow chart showing one application of the handling method according to the present invention, FIG. 7 is a partial schematic diagram showing the steps for stacking in the handling method according to the present invention, FIG. 8 is a schematic diagram showing the steps for picking up in another embodiment of the handling method according to the present invention, and FIG. 9 is a schematic view showing a modification of a hand of a robot according to the present invention.

FIG. 1 is a flow chart which shows a basic flow of the handling method according to the present invention, wherein the flow chart is applicable not only to an operation to grip material sheets (works) 2 one by one from a stack base 1 as shown in FIG. 2 but also to an operation to stack products 4 one by one on the stack base 3 as shown in FIG. 5. Firstly, the manner of operation for gripping the material sheets 2 one by one from the stack base 3 is explained in view of FIG. 1 and FIG. 2.

(Gripping step with work searching)

The left-side step line (I) of FIG. 1 and the schematic view of FIG. 2a show a step where in case that the work height SY of the material sheets stacked on the stacking base 1 is not accurately known, an uppermost sheet 2 is searched and then the work is gripped. The step (I) is made of following steps.

Step S1: A hand 5 is moved toward a position above the stack base 1. The stopping position (a horizontal position) and a stopping height YP are preliminarily taught.

Step S2: The hand 5 is descended at high speed to a search starting position YC. The data on the search starting position YC and the descending speed are preliminarily taught. The step S1 and the step S2 can be integrated as a single step.

Step S3: The hand 5 is descended at low speed from the search starting position YC. Namely, since accurate data on the work height SY is not accessible, the hand 5 is slowly descended to stop the movement of the hand 5 instantly thereby preventing the occurrence of damage on the hand as well as on the sheet. The descending speed is preliminarily taught. A work detecting sensor mounted on the hand 5 detects the uppermost sheet 2. The hand 5 is descended until the sheet 2 is detected by the work detecting sensor.

Step S4: Upon detection of the uppermost sheet 2 by the work detecting sensor, the descending of the hand 5 is stopped and the hand 5 grips the sheet 2 with a vacuum cup 6 thereof. Simultaneously, the value which is obtained by subtracting the thickness DY of a single sheet 2 from the present height HY of the hand 5 is stored as a data of the work height SY and such a data is used for the subsequent gripping step.

Step S5: The gripped sheet 2 is ascended a desired height KY to prevent an interference thereof with the remaining stacked sheet 2 and then is subjected to other processing steps such as feeding of the sheet to a working machine and stacking of the sheet.

(Gripping step based on stored data)

Subsequently, with reference to the right-side step line II and FIG. 2b, so called 'a feed-forward gripping step' which is carried out in case that the work height SY on the stack base 1 is almost accurately known is explained. Although, in this embodiment, the data on the work height HY obtained and stored in the step S4 of the gripping step I with work searching is utilized, data on the work height HY preliminarily obtained and stored by various other methods where the work height HY is manually or automatically measured can also be utilized. The claim 1 of 'What is claimed' is prepared so as to cover such cases as well.

Step S6: After carrying out all the other processing steps in the step S5, the hand 5 is again moved to a position above the stack base.

Step S7: Subsequently, the hand 5 is descended at high speed to a deceleration position which is calculated based on the detected or stored work height HY. The deceleration position is a height which is obtained by adding a desired value Ya, e.g. 20–50 mm to the stored work height SY detected or stored, for example, in the step S4.

Step S8: Then, the hand 5 is descended at low speed to the position of the work height SY.

Step S9: At this position, the vacuum cup is made to carry out a sucking operation so as to suck and grip the sheet 2. Simultaneously, the thickness DY of the sheet 2 is again subtracted from the present work height SY to obtain and store the work height of a next sheet 2 to be sucked and gripped (SY=SY−DY).

Step S10: The operation is advanced to the next step as in the case of the previously mentioned step S5.

The above-mentioned steps S6–S10 are repeated to grip the next sheet 2.

Next, with reference to FIG. 3 and FIG. 4, the flow chart which shows the gripping step I with work searching and the gripping step II based on stored data as a systematic or integrated flow is explained.

The step S11 shown in FIG. 3, is a step where it is judged whether a work searching should be carried out or not. For example, based on the judgement in this step, the work searching is carried out only once at the start of the handling operation or each time a desired number of work transferring are repeated. In case that the work searching is carried out in this step, a work search flag is set at a next step S12 (C1=1). In case that the work searching is not carried out, the work search flag C1 remains 0.

Subsequently, in case that the operation is advanced to either the step S1 or the step S6 of the previously mentioned gripping steps I, II, it is judged in a step S13 which routine should be taken between the gripping step I which accompanies the work searching and the gripping step II which is carried out based on the stored data in accordance with the setting of the work search flag which takes 1 or 0. Based on the judgement, the operation is advanced to either the line of the step I or the line of the step II.

In the line of step I, although the operation advances from the step S2 to S3 as mentioned previously, in this embodiment, a step S14 is interposed, wherein another sensor detects, for example, if the hand 5 is descended a desired height even when the work is not detected and judges whether the work searching operation should be stopped or not based on the result of the detection (See FIG. 5). If it is judged that work searching operation should be stopped, the entire operation is stopped (step 14a) and a trouble treatment is taken (step 14b). In case that the work searching operation is not stopped, that is, so long as the work searching stop detecting sensor does not detect the trouble, the work searching operation is continued.

As mentioned previously, in the step 3, if the work is detected, the operation is advanced to the step S4. In this operation, however, the step S4 is divided into three steps, namely, a descending stop step S4a, a work loading amount (SY) calculating step S4b and a work gripping step S4c. In these steps, a step S15 which resets the work search flag S1 previously set in the step S2 to 0 is interposed (see FIG. 4).

Furthermore according to this embodiment, in the gripping step II which is carried out based on the stored data (see the step S7 and steps advanced from the step 7 in FIG. 3), a step S16 which detects the presence of the work is interposed after the step S8 where the hand 5 approaches the work at low speed. If the work is not detected, namely, if the hand does not reach the uppermost work, a correction calculation is executed, wherein, for example, the value DY of one piece of sheet is subtracted from the amount of stacked works SY so as to renew the work height (step S17) and the hand 5 is again descended at low speed (step S8). On the other hand, if the work is detected, the data on the work height is not renewed and the operation returns to the main routine of the work gripping step (step S9c, see FIG. 4). the method shown in FIG. 6, after the arm elevating step (step S5a) shown in FIG. 4, it is judged whether the work is gripped or not (step S18). If the work is not gripped, namely, the hand fails to grip the work or drops the work in the midst of the elevating after gripping, an error count is judged (step 19), the number or errors is counted (step S23), and a correction calculation of the work stacked amount is executed (step S20), and the hand is made to approach the corrected work height (step S21). Then, until the work is detected (step S22), the correction of the work height and the approaching of the arm are repeated. When the work is detected, the operation returns to the work gripping steps (step S4C, S9C). Then, again, or when the gripping failure is repeated a predetermined time, the error count is judged in step S19 where the error count is compared with a predetermined value C0 and succeeding steps are stopped to carry out an error treatment. An error count clear (EC=0) step 24 shown in an imaginary line in FIG. 3 is provided for returning the count number to 0 prior to the error counting in FIG. 6.

Although the above-mentioned embodiments all explain the cases in which work sheets are picked up from the stack base one by one, as shown in FIG. 7, an operation to stack products 4 on the stack base 3 sequentially can be carried out almost in the same method as that of the above-mentioned flow charts (FIG. 1, FIGS. 3 to 4). In this case, the work is released in place of the work gripping operation. When the work height is renewed, a height which corresponds to the thickness of one product is sequentially added. Furthermore, checking of the work gripping operation as shown in FIG. 6 becomes unnecessary.

Figure 10:
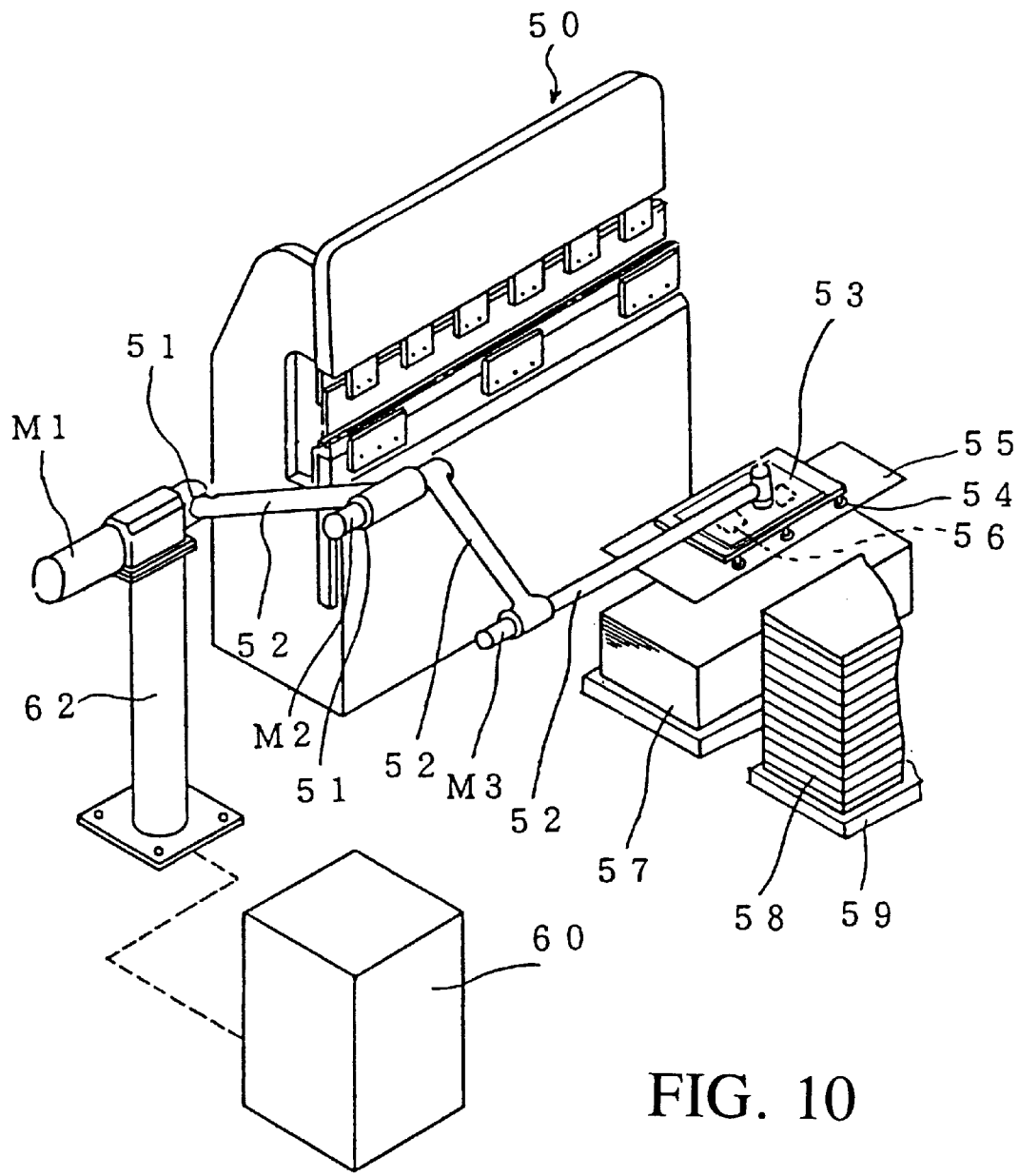
FIG. 10 is a schematic view showing a conventional robot and peripheral devices thereof.

FIG. 8 is a flow chart of a combined operation made of the above-mentioned sheet picking up operation and the product stacking operation carried out by an actual robot, for example, as shown in FIG. 10. Namely, a piece of sheet 2 is picked up from the sheet stack base 1 shown in FIG. 2 (step S30), is fed to a working machine (step S31), a part of the sheet 2 or usually several parts of the sheet 2 are subjected to a working while being gripped by the working machine (step S32). Upon completion of the working operation, the sheet 2 is taken out from the working machine (step S33) and the sheet 2 is stacked on the product stack base 3 shown in FIG. 7 (step S34). Then, again, the robot approaches the sheet stack base 1 to pick up the work sheet 2. With the robot which carries out the working of the product in such a cycle, the above-mentioned handling method according to the present invention can be applied to the step S30 for gripping the work and to the step 34 for stacking the product.

In FIG. 9, one embodiment of a preferred hand portion of the robot according to the present invention is shown. In FIG. 9, numeral 11 indicates an arm and numeral 12 indicates a hand. The hand 12 comprises a shaft portion 13 which is elevated and lowered mounted on the arm 11, a vacuum or suction cup 6 mounted on the lower extremity of the shaft portion 13 and a spring 14 provided for biasing the shaft portion 13 downward relative to the arm 11.

A ferromagnetic member 15 is mounted on the upper extremity of the shaft portion 13 and a magnetic sensor 17 which works as a work detector is attached to a bracket 16 mounted on the arm 11 and such magnetic sensor 17 detects lifting of the shaft portion 13 which is caused when the vacuum cup 6 comes into contact with the sheet 2 stacked on the sheet stack base 1. Above and spaced apart from the magnetic sensor 17 with a desired space, a second magnetic sensor 18 is mounted on the bracket 16 for detecting a work search stopping. This second magnetic sensor 18 is provided for instantly stopping the operation of the robot when the magnetic sensor 17 for detecting work is inoperative by any possible reason. The output of the second magnetic sensor 18 is used for a judgement in the work search stopping detecting step S14 in FIG. 5. Furthermore, the arm 11 is provided with a vacuum sensor 19 for detecting the gripping failure of the vacuum cup 6. The vacuum cup 6 is connected with a vacuum source such as a vacuum pump or a venturi-type aspirator by way of the vacuum sensor 19. The above-mentioned magnetic sensor may be made of other kinds of sensor provided that they are used for detection of positions. For example, a photoelectric sensor may be used in place of the magnetic sensor.

The main body of the robot and the control device thereof may be made of those used in the conventional robot as shown in FIG. 10. This type of robot comprises the main body which is made of a support strut 62 fixedly mounted on a foundation, a plurality of arms 52,52,52 which are sequentially supported on the support strut 62 and are rotatable relative to each other by means of a plurality of revolute joints 51,51, a plurality of motors M1, M2, M3 for rotatably driving the arms 52,52,52, a plurality of position detectors which detect rotating angles of respective motors or arms and the like, and a control device which is mainly made of a microcomputer which generates drive signals for driving a group of drive motors M1, M2, M3 in accordance with a desired program based on the detected data and teaching data and transmits such drive signals to the driving motors M1, M2, M3.

The work height detecting elements which can be used in the method and the robot according to the present invention may be comprised of angle detecting elements such as encoders mounted on the revolute joints and a block of the control device which converts the detected angles to the height coordinate. Although the gripping hand is made of the vacuum cup type in the above-mentioned embodiment, the gripping hand may be made of an electromagnetic suction type or a gripping finger type. Although the method according to the present invention is used not only for gripping the sheets but also stacking the products in the embodiment shown in FIG. 8, it may be possible to adopt a conventional method in one of the operations, or to use a stack base which is elevated and lowered and to adopt the method according to the present invention to only either of sheet gripping operation or the product stacking operation.

Industrial Applicability

The handling method according to the present invention requires less time for approaching the work so that the operation cycle time can be drastically shortened compared to the conventional method.

What is claimed is:

1. A handling method for approaching a work gripping hand toward a stack base and works stacked on the stack base so as to pick up or stack works, comprising;

(a) a work search step of positioning the hand at a position a first predetermined distance above the stack base and allowing the hand to approach the stack base at low speed until the work or the stack base disposed below the hand is detected and stopping the hand when the work or the stack base is detected, (b) a step of storing the detected position as the height of works, (c) a gripping step of gripping the work or releasing the gripped work at the hand stopped position, (d) an intermediate step for advancing to a next step, (e) a high speed approaching step of positioning the hand again at a position a second predetermined distance above the stack base and allowing the hand to descend at high speed to a deceleration starting position which is slightly above the stored height of works, (f) a low speed approaching step allowing the hand to descend to the stored height of works, (g) a re-gripping step of gripping the work or releasing the gripped work, and (h) a step of repeating the above steps (d) to (g);

wherein, in the low speed approaching step (f), a detecting operation whether the work is present or not is carried out and if the work is not detected, a correcting calculation is made to further add or subtract a desired value, and, again, the arm is descended to a height of the corrected data at low speed.

2. A handling method according to claim 1, wherein, in the step (b), a calculation is made in such a manner that the thickness of one sheet of or one piece of work is added to or subtracted from the data of height of the hand obtained in the work search step (a) so as to obtain the data on work height.

3. A handling method according to claim 1, wherein, in the low speed approaching step (f), the arm is descended until the work is detected, and the data is corrected based on the work stacked height at the time of detection.

* * * * *